July 5, 1927.

L. E. LA BRIE

BRAKE

Filed Jan. 11, 1926

INVENTOR
LUDGER E. LA BRIE
BY
M. W. McConley
ATTORNEY

Patented July 5, 1927.

1,634,368

UNITED STATES PATENT OFFICE.

LUDGER ELIZE LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed January 11, 1926. Serial No. 80,396.

This invention relates to brakes, and is illustrated as embodied in an internal expanding front wheel automobile brake.

An object of the invention is to provide a novel positioning or centering device for the shoes, or other friction device, utilizing a lever preferably having a wedging action to tension a spring which serves to return the shoes when the brake is released.

Another feature of the invention relates to a novel control, especially adapted for use with an automobile brake, which permits the use of friction means, such as a set of connected shoes, shiftable to anchor at one end when the drum is turning in one direction and at the other end when the drum is turning in the other direction, and yet which insures that at least when the vehicle is moving forward there will be no movement of the anchored end away from the anchor during the initial part of the brake-applying movement. This not only reduces lost motion but also eliminates the clicking noise of one end of the friction means re-seating itself on its anchor.

Other features relate to improved anchoring means for a brake of this type, to a novel shoe construction, and to other new combinations of parts and desirable particular constructions which will be apparent from the following description of one illustrative embodiment shown in the accompanying drawings, in which:

Fig. 6 is a diagram corresponding to a top plan view of Fig. 1, and illustrating the release of the outer brake on a turn.

Figure 1:
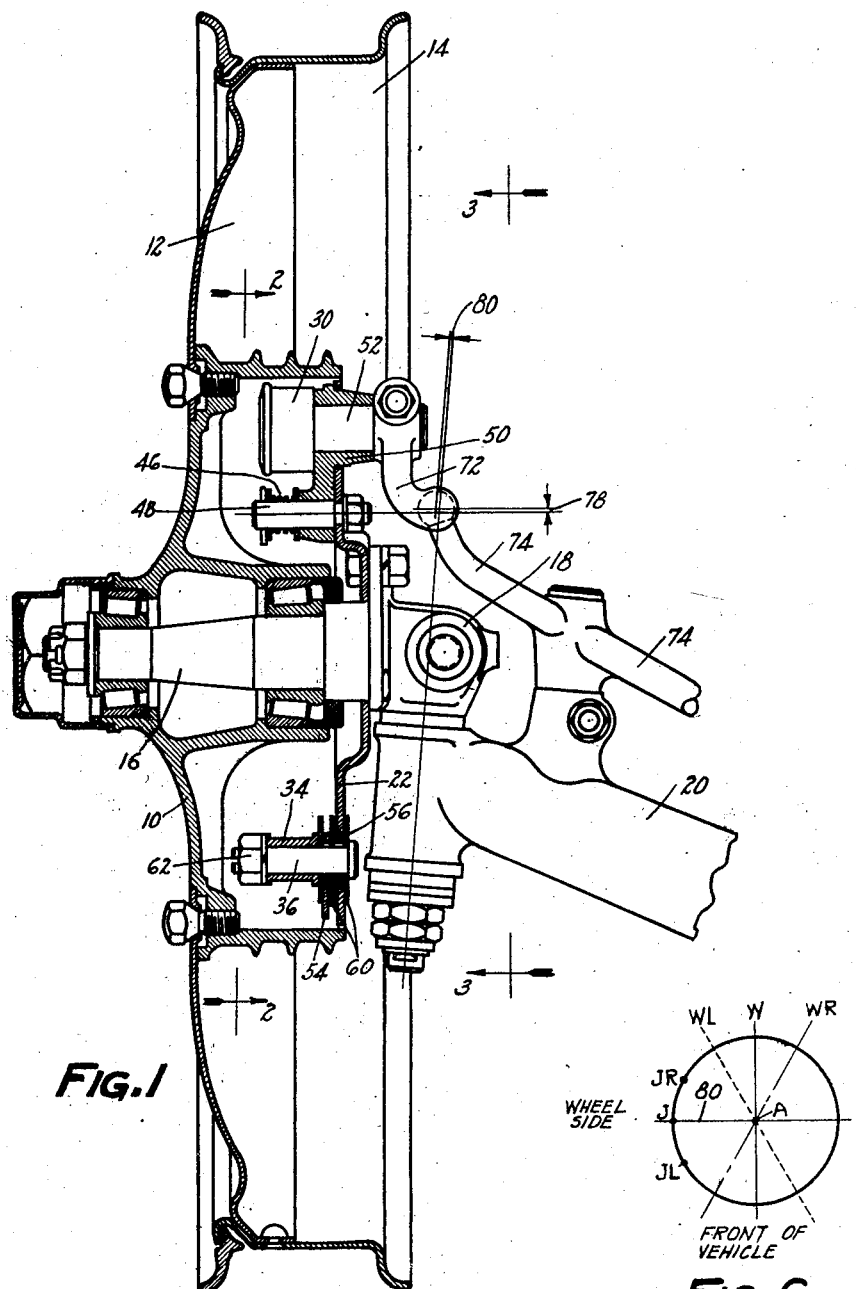
Fig. 1 is a vertical transverse section through one front wheel and brake, looking toward the rear of the car.

The brake selected for illustration includes a one-piece hub and brake drum 10, on which an annular disk 12 carrying the rim 14 is mounted. The hub and drum 10 is rotatably mounted on the spindle 16 of a knuckle 18 swivelled in one end of the front axle 20. A backing plate 22 closing the open side of the drum is secured to knuckle 18.

The friction means of the brake preferably includes a set of interchangeable floating shoes 24 and 26, shown as having wear plates 28 at their adjacent ends engaging a double cam 30 or equivalent expanding means. At their opposite ends the shoes are notched out to form semi-cylindrical bearings held by a spring 32 against a bushing 34 on a pivot or other connection 36. Cam 30 has a flange at its end and confining the ends of the shoes against lateral movement.

Just back of plates 28, shoes 24 and 26 are cut away to form notches facing toward the ends of the shoes. L-shaped wear parts 38 are secured by bolts 40 along the sides of the shoes, each with one leg projecting into its notch to form an approximately radial abutment surface anchoring against an adjustable eccentric anchor 42 mounted on the backing plate.

Bolts 40 also hold plates 44 for a return spring 46 connecting the shoes and urging them away from the drum and against anchors 42. The central part of spring 46 is coiled about a pin 48 (Fig. 1), carried by the backing plate, thus forming a compression spring lightly clamping against the plate a support or bracket 50 pivotally mounted on pin 48. Support 50 has at its upper end a bearing projecting through a somewhat larger opening in plate 22, and in which is journalled a shaft 52 integral with or secured to the cam 30.

Figure 2:
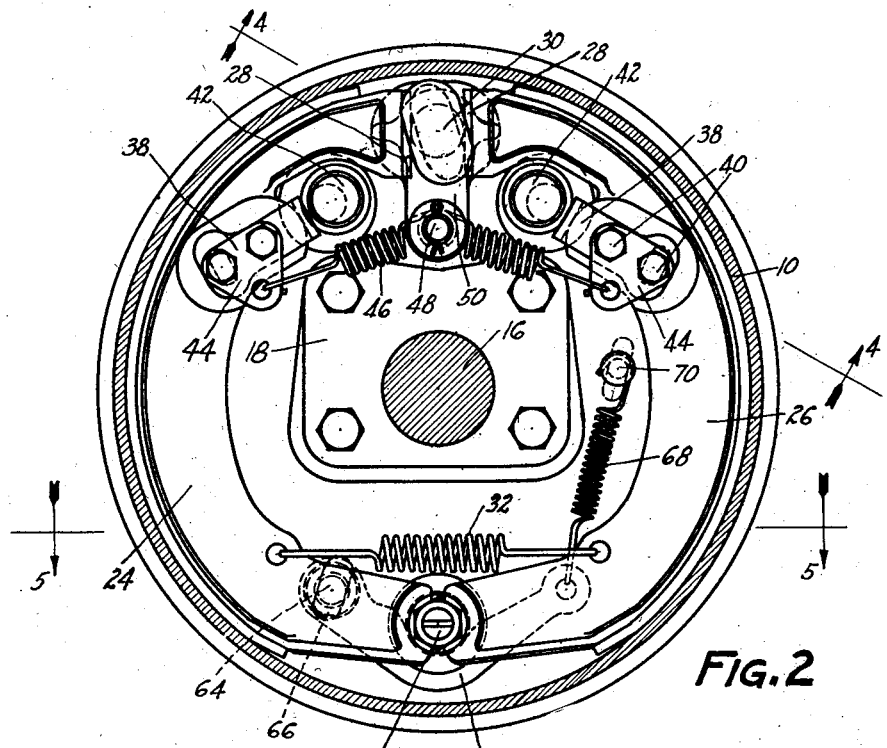
Fig. 2 is a vertical section through the brake, on the line 2—2 of Fig. 1.
Figure 4:
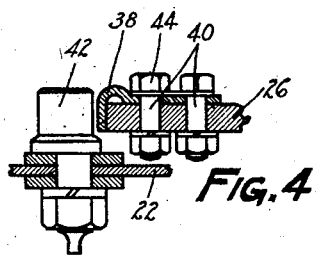
Fig. 4 is a sectional detail on the line 4—4 of Fig. 2, showing one anchor.

By the above-described arrangement, it will be seen that cam 30 forces shoes 24 and 26 apart against the drum, and can shift about pivot 48 so that shoe 24 anchors against its anchor 42 when the drum is turning clockwise in Fig. 2 (vehicle moving forward), or shoe 26 may anchor against its anchor 42 when the drum is turning counterclockwise in Fig. 2 (vehicle moving backward). When the brake is released both shoes engage the anchors 42, which, being eccentric, may be turned to preserve a predetermined clearance between the shoes and drum as the brake lining wears.

Figure 5:
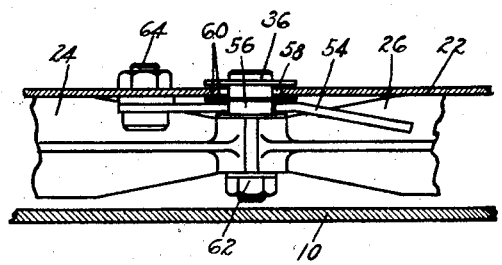
Fig. 5 is a partial section on the line 5—5 of Fig. 2, showing the centering lever.
Figure 3:
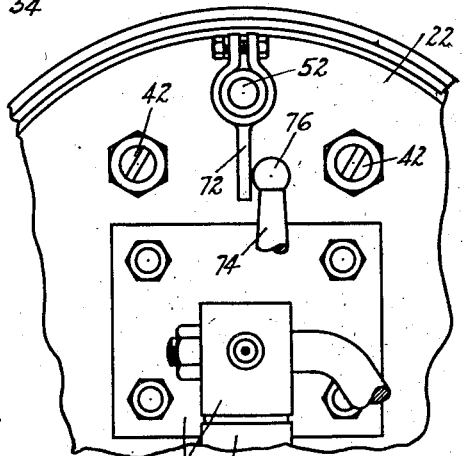
Fig. 3 is a partial vertical section on the line 3—3 of Fig. 1.

The shoes are centered when released by a lever 54 having a double wedge surface embracing a roller 56 on pivot pin 36 (Figs. 1 and 5). Pin 36 projects through a slot 58 along a chord of the backing plate, and has washers 60 lightly clamped against opposite sides of the backing plate by tightening a nut 62 on the end of the pin. The lever is fulcrumed on a pivot 64 adjustably clamped in a radial slot 66 in the backing plate (Fig. 2), and is rocked when the shoes shift in either direction, by the wedging action of roller 56, in such a manner as to tension a centering spring 68 connected at its ends to the free end of lever 54 and to an adjustable pin 70 carried by the backing plate. Pin 36 also serves to hold the lower ends of the shoes against lateral movement.

Shaft 52 is rocked to apply the brake by an arm 72 adjustably clamped on its end and extending toward the pivotal axis about which support 50 shifts. Arm 72 is operated by means such as a lever 74 fulcrumed on axle 20 for movement about a generally vertical axis. Lever 74 is shown with a ball 76 at its end engaging a plane surface on arm 72.

I prefer that the center of ball 76 should not be exactly in the axis of pivot 48 when the brake is applied, which would permit support 50 to swing freely in either direction, but a short distance 78 (Fig. 1) above that axis. This distance is selected so that there is no material interference with the swinging of support 50 as one or the other of shoes 24 or 26 seats on its anchor, while yet there is a sufficient component of force tending to turn support 50 about its axis so that the support and cam 30 move bodily forward to cause shoe 26 to engage the drum, before cam 30 really begins to turn to urge both shoes toward the drum. During this time shoe 24 is held against its anchor 42, while lever 54 holds it away from the drum.

If at this time drum 10 is turning counterclockwise in Fig. 2, i. e. if the car is moving backward, further movement of lever 74 rocks cam 30 to force both shoes against the drum, and the friction of the drum is sufficient to swing support 50 back again and cause shoe 26 to seat against its anchor 42. This does not often occur, however, as usually the vehicle is moving forward when the brakes are applied.

If the vehicle is moving forward and drum 10 in Fig. 2 is turning clockwise (the usual case), however, there is no such lost motion as just described. In this case, shoe 24 remains seated against its anchor 42 at all times, and the brake is applied as smoothly and gradually as if shoe 24 were anchored on a fixed pivot. After shoe 26 engages the drum, and as cam 30 begins to turn, shoe 26 turns circumferentially with the drum and forces shoe 24 about anchor 42 toward the drum, against the resistance of spring 68. This successive action of the shoes gives a very smooth and gradual application of the brake.

When the brake is used on a front wheel, as illustrated, the center of ball 76 is arranged, when the brake is applied, in or immediately adjacent the swivelling axis of the wheel, so as not to interfere with steering. If it is desired to relieve the pressure on the outer brake on a turn, to guard against skidding, the center of ball 76 is not exactly in the swivelling axis, when the brake is applied, but is a short distance 80 of a few hundredths of an inch away from that axis, on the side next the wheel.

The result is shown on an enlarged and distorted scale in Fig. 6. "W" is a line through the swivelling axis "A" of the wheel parallel to the wheel when the vehicle is running straight ahead. "WL" is a similar line parallel to the wheel when it has been swivelled to turn to the left, placing it on the outer side of the turn (the right-hand front wheel of the car being shown, regarding it from the driver's seat, or in the opposite direction from the point of view in Fig. 1). "WR" is a similar line parallel to the wheel when it has been swivelled to steer to the right, placing it on the inner side of the turn.

When the wheel is parallel to "W", the joint between lever 74 and arm 72 is at "J", opposite axis A. When the wheel is parallel to line "WR", on the inner side of the turn, arm 72 swings with the wheel about axis "A", and tries to crowd the joint back to "JR", thus slightly increasing the pressure on the brake. But when the wheel is parallel to "WL", on the outer side of the turn, arm 72 swings to "JL", away from lever 74, thus slightly relieving the pressure on the brake.

It will be observed that the center of ball 76 when the brake is applied is in this particular instance immediately adjacent the intersection of the swivelling axis of the wheel with the pivotal axis or axis of pivot 48, but slightly above the pivotal axis and slightly outside the swivelling axis.

While one illustrative embodiment has been described in detail, it is not my intention to limit the scope of the invention to that particular embodiment, or otherwise than by the terms of the appended claims.

I claim:

1. A brake comprising a friction device, in combination with positioning means therefor including a lever and a part having wedging engagement with the lever and a spring tensioned by movement of the lever due to relative wedging movement of the lever and said part.

2. A brake comprising a friction device, in combination with positioning means therefor including a lever supported and fulcrumed separately from the friction device and swung by movement of the friction device and a spring tensioned by movement of the lever due to relative movement of the lever and the friction device.

3. A brake comprising a friction device and an adjacent stationary support, in combination with a lever mounted on the support, a part moving with the friction device and engaging the lever, and a spring tensioned by movement of the lever by said part.

4. A brake comprising a friction device and an adjacent stationary support, in combination with a lever mounted on the support and provided with a wedge surface, a part moving with the friction device and wedgingly engaging the lever, and a spring tensioned by movement of the lever by said part.

5. A brake comprising, in combination, a friction device, a lever having a wedge surface on one edge, a part wedgingly engaging said surface, the lever and said part being moved relatively to each other, to rock the lever by movement of the friction device, and a spring resisting the rocking of the lever.

6. A brake comprising, in combination, a drum, a friction device anchoring at one end when the drum is turning in one direction and at the other end when the drum is turning in the other direction, a lever having a double wedge surface on one edge, a part wedgingly engaging said surface, the lever and said part being moved relatively to each other, to rock the lever by movement of the friction device in either direction, and a spring resisting the rocking of the lever.

7. A brake comprising, in combination, a drum, a plurality of connected shoes shiftable with respect to the drum so that one shoe is anchored when the drum is turning in one direction and a different shoe is anchored when the drum is turning in the other direction, a support adjacent the shoes, a lever mounted on the support, means for rocking the lever when the shoes shift in either direction, and a spring tensioned by the rocking of the lever.

8. A brake comprising, in combination, a drum, a plurality of connected shoes shiftable with respect to the drum so that one shoe is anchored when the drum is turning in one direction and a different shoe is anchored when the drum is turning in the other direction, a support adjacent the shoes, a lever mounted on the support, a lever-engaging part shifting with the shoes and arranged to rock the lever when the shoes shift in either direction, and a spring tensioned by the rocking of the lever.

9. A brake comprising, in combination, a drum, a set of floating connected shoes within the drum having adjacent free ends, a floating shoe-expanding cam engaging said ends, the shoes being cut away near said ends and having abutment parts facing toward said ends, and a pair of fixed stops engaged respectively by said abutment parts and one or the other of which serves as an anchor for all of the shoes.

10. A brake comprising, in combination, a drum, an expansible friction device floating within the drum having adjacent free ends, a floating expanding cam engaging said ends, the friction device being cut away near said ends and having abutment parts facing toward said ends, and a pair of fixed stops engaged respectively by said abutment parts and one or the other of which serves as an anchor for the friction device.

11. A brake shoe having a cam follower part at one end and cut out to form a notch adjacent said end with a separate abutment part crossing the wall of said notch and facing toward said end.

12. A brake shoe having a cam follower part at one end and cut out to form a notch adjacent said end with an approximately radial L-shaped abutment part forming the wall of said notch facing toward said end and secured with one leg overlapping the side of the shoe and with the other projecting into the notch to form said wall.

13. A wheel having a brake including a drum and friction means shiftable to anchor at one end or the other according to the direction of rotation of the drum, in combination with a floating brake-applying device acting on said ends, and means for operating said device arranged to shift it bodily when the brake is first applied to force one end of the friction means against the drum before sufficient force is applied to the other end to cause it to move toward the drum.

14. A wheel having a brake including a drum and friction means shiftable to anchor at one end or the other according to the direction of rotation of the drum, in combination with a floating brake-applying device acting on said ends, and means for operating said device having a component of force arranged to shift it bodily when the brake is first applied to force one end of the friction means against the drum before sufficient force is applied to the other end to cause it to move toward the drum, said component being small enough to be readily overcome by the friction of the drum when it turns in a direction to anchor said device at its first end.

15. A wheel having a brake including a drum and friction means shiftable to anchor at one end or the other according to the direction of rotation of the drum, in combination with a floating pivotally-mounted brake-applying device acting on said ends, an arm for operating said device, and applying means acting on the arm in a manner to rock it to expand the friction means but engaging it at such a point as to swing it about its pivot when the brake is first applied.

16. A wheel having a brake including a drum and friction means, in combination with a floating pivotally-mounted brake-applying device acting on said means, an arm for operating said device, and applying means acting on the arm in a manner to rock it to expand the friction means but engaging it at such a point as to swing it about its pivot when the brake is first applied.

17. A wheel having a brake including a drum and friction means, in combination with a pivotally-mounted support carrying a brake-applying device including an arm extending toward the pivotal axis, and applying means engaging said arm immediately adjacent that axis on the side next the brake-applying device so as to have a component of force tending to swing the support about the pivotal axis.

18. A wheel having a brake including a drum and friction means, in combination with a pivotally-mounted support carrying a brake-applying device including an arm extending toward the pivotal axis, and an operating lever having a part engaging said arm immediately adjacent that axis on the side next the brake-applying device so as to have a component of force tending to swing the support about the pivotal axis.

19. A brake comprising, in combination, a drum, a set of connected shoes engageable with the drum and shiftable to anchor on one shoe when the drum is turning in one direction and on a different shoe when the drum is turning in the opposite direction, and brake-applying means shiftable to permit anchoring on either shoe but arranged to force one of the shoes against the drum before initiating applying movement of the other shoe.

20. A brake comprising, in combination, a drum, a floating friction device engageable with the drum and shiftable to anchor at one end when the drum is turning in one direction and at the other end when the drum is turning in the opposite direction, and brake-applying means acting on both ends and shiftable to permit anchoring at either end but arranged to force one of the ends against the drum before initiating applying movement of the other end.

21. A brake comprising, in combination, a drum, a plurality of connected shoes shiftable with respect , the drum so that one shoe is anchored when the drum is turning in one direction and a different shoe is anchored when the drum is turning in the other direction, a support adjacent the shoes, a lever mounted on the support, means for rocking the lever when the shoes shift in either direction, and means to resist rocking of said lever and tending to return it to its original position.

In testimony whereof, I have hereunto signed my name.

LUDGER ELIZE LA BRIE.